Nov. 8, 1955 J. O. GRADY 2,722,767
COMBINATION FLOAT AND RECEPTACLE
Filed Aug. 20, 1952
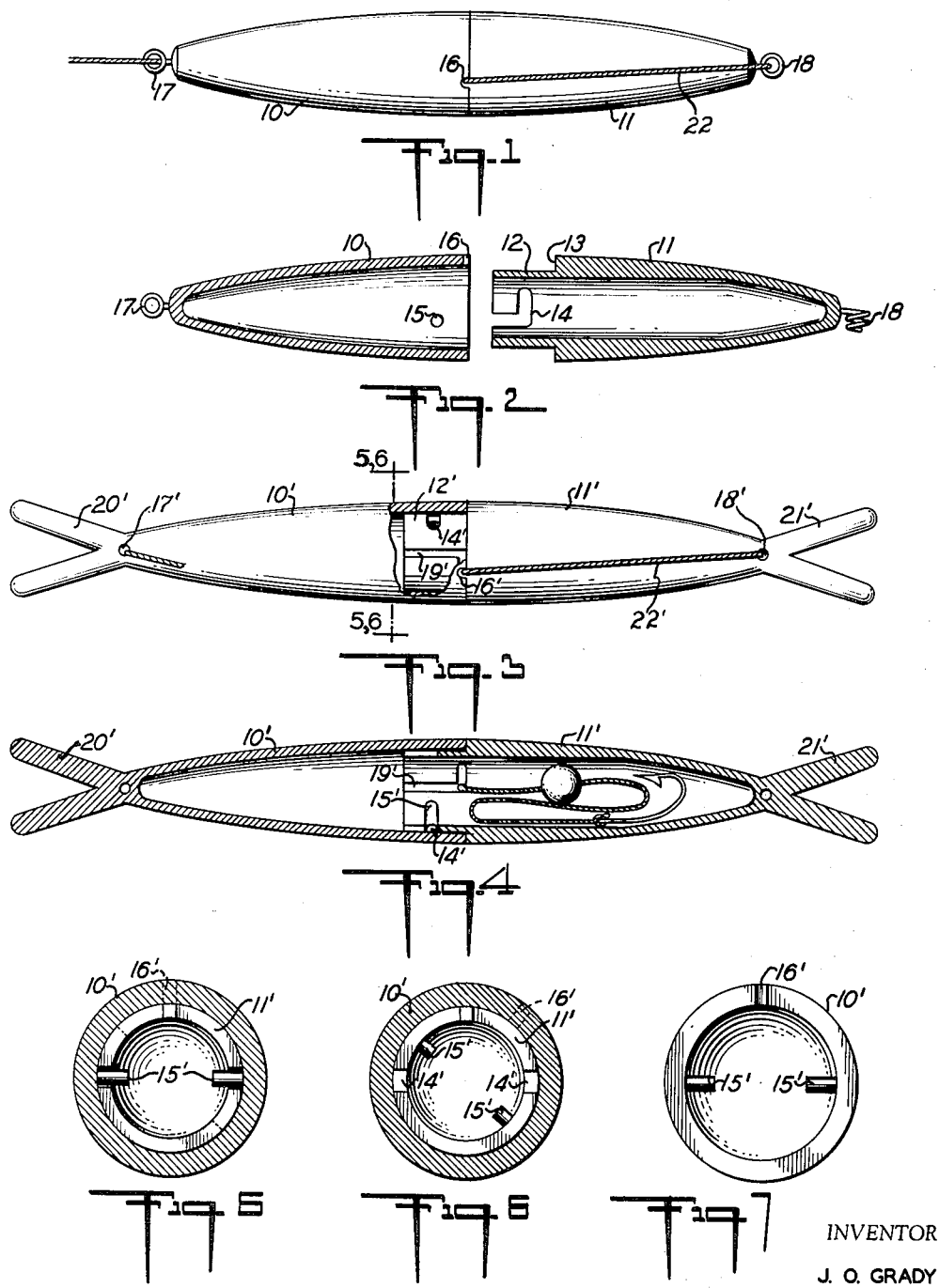
INVENTOR
J. O. GRADY
BY
ATTORNEY

United States Patent Office 2,722,767
Patented Nov. 8, 1955

2,722,767

COMBINATION FLOAT AND RECEPTACLE

John O. Grady, Arab, Ala.

Application August 20, 1952, Serial No. 305,453

3 Claims. (Cl. 43—43.11)

This invention relates to fishing tackle and more particularly to a combination float and receptacle in which a fish hook can be readily inserted and carried when such hook is not in use including, for example, during movement of a fisherman from one fishing spot to another.

When fishing it is desirable at times to move from one location to another in an effort to locate good fishing or to find a spot where fish bite. Movement of the fisherman is sometimes sudden without putting away the tackle but with the hook exposed and it is not unusual for the fisherman to trip in moving from one location to another with the line and attached hook becoming entangled or snarled and occasionally resulting in an accident with the fisherman having the sharp end of the hook embedded in his flesh.

In order to prevent accidents and injury to equipment as well as to the person the points of hooks have been shielded in various ways as for example by embedding the same in corks or in other ways. Efforts to avoid accidents have not been entirely successful as they still happen and the present invention is directed to a solution of this problem.

It is an object of the invention to overcome the possibility of a fish hook becoming engaged or embedded in an object including the human body during movement of the fisherman from one fishing location to another or to and from the fishing grounds.

Another object of the invention is to provide a simple and inexpensive float or other article used in fishing which also may serve as a container or holder for a fish hook and sinker both attached to a fishing line and access to which container can be easily had with a minimum of time and effort.

A further object of the invention is to provide a combination float of plastic or other material which may serve as a depository for the fish hook, and as a body upon which the fishing line may be wound.

Further objects and advantages of the present invention will be apparent from the following description taken in conjunction with the accompanying drawings wherein:

Fig. 1 is a side elevation of a two part hollow fisherman's float illustrating one application of the invention;

Fig. 2, a central longitudinal section thereof with the parts disconnected;

Fig. 3, a side elevation of a slightly modified form of float with forked ends about which a fishing line may be wound, parts being broken away to illustrate the construction more clearly;

Fig. 4, a central longitudinal section through the float of Fig. 3;

Figs. 5 and 6 are sections on the lines 5—5 and 6—6 respectively of Fig. 3, illustrating respectively the parts prior to and after connection; and Fig. 7, an end view of the outer member of Fig. 3.

Briefly stated, the invention comprises an elongated two part float each part of which is hollow and the parts being connected by a bayonet joint and with an opening so that the line may pass from the exterior to the hollow interior of the float. At the opposite ends of the float are openings through which a fishing line may be located. Thus, the float may serve to house the hook, sinker and part of the line when they are not being used in fishing.

The float likewise may have forks, one at each end, as shown in Figs. 3 and 4, so that the line may be wound around said forks lengthwise of the float.

With continued reference to the drawings, the combination float, fish hook, and line holder of the present invention may be of turned wood, plastic, or other appropriate material and may comprise an elongated body having hollow sections or members 10 and 11. One of the sections has a reduced portion 12 providing a shoulder 13, such reduced section being of external diameter corresponding to the internal diameter of the end of the float section received upon such reduced portion and fitting against the shoulder 13 when the parts are assembled.

The section 11 has a bayonet slot 14 for receiving a pin 15 by means of which the parts may be locked together. The section 10 has a line-receiving opening or recess 16 to accommodate a fishing line 22 extending from the exterior to the interior of the float.

If desired, the end sections of the float may be provided with eyes 17 and 18 providing openings through which the fishing line 22 may be disposed. The nature of the eyes 17 and 18 may be varied in accordance with available facilities to define openings for receiving the fishing line 22 as shown in Fig. 2.

As shown in Fig. 1, the line 22 extends through eye 17 and longitudinally of the body and through eye 18, it then passing into the interior of the body through opening 16. The end of the line 22 extending into the body will carry a suitable hook and sinker as disclosed in the modification of Fig. 4.

The structure of Figs. 3 and 4 are of a similar character but with the reduced portion 12' also provided with an L-shaped line slot 19' extending lengthwise of the reduced portion and then laterally as illustrated particularly in Fig. 4. Further, the floats of Figs. 3 and 4 have forks 20' and 21' about which the fishing line 22' may be wound. Holes 17' and 18' are provided adjacent the forks 20' and 21' through which the fishing line 22' can extend in a manner similar to the line 22 of Fig. 1.

It will be readily understood that the device of the present invention serves the multiple function of a float when fishing as a container to house within its hollow body the fish hook and sinker intact with the fishing line and as illustrated particularly in Figs. 3 and 4, when not in use, and it may serve as a body around which the fishing line may be wound. It will be apparent that the length and diameter of the device may be varied to suit the requirements.

When the fish hook is carried within the float it cannot cause injury or damage and cannot become entangled or catch on some object.

It will be obvious to those skilled in the art that various changes may be made in the invention without departing from the spirit and scope thereof and therefore the invention is not limited by that which is shown in the drawings and described in the specification but only as indicated in the appended claims.

What is claimed is:

1. A combination fishing float and storage container for a fish hook fastened to a line connected to said float comprising an elongated hollow body having two members circular in cross section with at least a portion of one member telescoping into at least a portion of the other member, the telescoping portion of said one member having a bayonet slot and a cooperating projection extending inwardly from the telescoping portion of the said other member for reception in the bayonet slot for securely connecting the members in substantially fluid-tight relation, said portion of said one member having an L-shaped slot formed therein for receiving a line, the corresponding walls of said L-shaped slot being generally parallel to the walls of said bayonet slot whereby the line may extend freely through the L-shaped slot from the exterior to the interior of the float thereby avoiding damage to the line.

2. A combination fishing float and storage container for a fish hook fastened to a line connected to said float comprising an elongated hollow body having two members circular in cross section with at least a portion of one member telescoping into at least a portion of the other member, the telescoping portion of said one member having a bayonet slot and a cooperating projection extending inwardly from the telescoping portion of the said other member for reception in the bayonet slot for securely connecting the members in substantially fluidtight relation, said portion of said one member having an angular slot formed therein for receiving a line, the walls of a portion of said last mentioned slot being parallel to a plane generally transverse to said elongated hollow body, the portion of said other member having a recess therein which opens into the line receiving slot in said one member, whereby the line may extend freely through the recess and said line receiving slot from the exterior to the interior of the float thereby avoiding damage to the line.

3. A combination fishing float and storage container for a fish hook fastened to a line connected to said float comprising an elongated hollow body having two members circular in cross section with at least a portion of one member telescoping into at least a portion of the other member, the telescoping portion of said one member having a bayonet slot and a cooperating projection extending inwardly from the telescoping portion of the said other member for reception in the bayonet slot for securely connecting the members in substantially fluid-tight relation, said portion of said one member having an L-shaped slot formed therein for receiving a line, the corresponding walls of said L-shaped slot being generally parallel to the walls of said bayonet slot whereby the line may extend freely through the L-shaped slot from the exterior to the interior of the float thereby avoiding damage to the line, and forks having diverging elements formed at each end of said body for winding the exterior portion of the fishing line around for storage purposes and acting as an auxiliary means for maintaining the two members in connected condition.

References Cited in the file of this patent

UNITED STATES PATENTS

| | | |
|---|---|---|
| 842,540 | Fleming | Jan. 29, 1907 |
| 1,216,863 | Simonds | Feb. 20, 1917 |
| 1,307,273 | Salley | Jan. 17, 1919 |
| 1,454,050 | Gruenhagen | May 8, 1923 |
| 1,454,429 | Dresser | May 8, 1923 |
| 2,531,418 | Fitzharris | Nov. 28, 1950 |

FOREIGN PATENTS

| | | |
|---|---|---|
| 23,299 | Australia | June 9, 1936 |